United States Patent
Weikard et al.

(10) Patent No.: US 6,323,254 B1
(45) Date of Patent: Nov. 27, 2001

(54) UV-CURABLE BINDERS AND THEIR USE FOR PRODUCTION OF HIGH GLOSS COATINGS

(75) Inventors: Jan Weikard, Köln; Wolfgang Fischer, Meerbusch; Manfred Müller, Mönchengladbach, all of (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 09/480,317

(22) Filed: Jan. 10, 2000

(30) Foreign Application Priority Data

Jan. 22, 1999 (DE) ................................ 199 02 403

(51) Int. Cl.⁷ .......................... C08F 2/46; C09D 167/08; C09D 167/107; C09D 167/06
(52) U.S. Cl. ............................ 522/107; 522/90; 522/97; 522/104; 522/173; 522/178; 522/179; 522/181; 522/96
(58) Field of Search ..................................... 522/104, 107, 522/90, 96, 97, 173, 178, 179, 181

(56) References Cited

U.S. PATENT DOCUMENTS

| 5,212,213 | * | 5/1993 | Hutter . |
| 5,470,897 | * | 11/1995 | Meixner et al. . |
| 5,719,213 | * | 2/1998 | Kicko-Walczak et al. . |
| 5,744,248 |   | 4/1998 | Meixner et al. ................ 428/482 |

FOREIGN PATENT DOCUMENTS 341956   11/1989   (EP) .
WO 95/05410 * 2/1995 (WO) .

OTHER PUBLICATIONS

Glasurit–Handbuch Lacke und Farben (month unavailable); pp. 55–56, "Ungesättigte Polyester (UP–Harze)" and pp. 579–585, "Lacke auf Basis ungesättigter Polyester (UP–Lacke)".

\* cited by examiner

Primary Examiner—Susan W. Berman
(74) Attorney, Agent, or Firm—Joseph C. Gil; Thomas W. Roy

(57) ABSTRACT

The present invention relates to binders, which can be cured by free-radical polymerization initiated by UV light, and contain a) 10 to 90 parts by wt. of a polymer which contains, in chemically bound form, both ethylenically unsaturated groups and the reaction product of a resin containing abietic acid with not more than 50% of the OH groups of a polyfunctional alcohol having a molecular weight of less than 500, b) 10 to 90 parts by wt. of one or more mono- di-or oligoesters of (meth)acrylic acid having a molecular weight of less than 800 and c) optionally 0.1 to 10 parts by wt. of a photoinitiator component for the free-radical polymerization wherein the weights of a) and b) add up to 100.

The present invention also relates to coating compositions containing these binders which are suitable for the production high-gloss coatings.

9 Claims, No Drawings

UV-CURABLE BINDERS AND THEIR USE FOR PRODUCTION OF HIGH GLOSS COATINGS

BACKGROUND OF THE INVENTION

1. Field of the Invention

The present invention relates to UV-curable binders and their use for the preparation of high-gloss coatings which can be cured by free-radical polymerization initiated by UV light.

2. Description of the Prior Art

It is known that unsaturated polyester resins, in particular those dissolved in styrene, are suitable for the production of high-gloss coatings on rough or porous surfaces, such as wood. A distinction is made here between paraffin-containing, and air-drying (also called gloss polyesters) types (Glasurit-Handbuch Lacke und Farben. Curt R. Vincentz Verlag, Hannover, 11th edition, 1984). Paraffin-containing unsaturated polyesters are applied in thick layers of up to approx. 1 mm and after curing initiated with (hydro)peroxides and metal siccatives, are usually sanded and polished to a high gloss. Air-drying unsaturated polyesters can cure to a high gloss by themselves, but have a lower reactivity than the paraffin-containing products and usually cannot be readily polished. Air-drying unsaturated polyester resins can also be cured under UV light using photoinitiators. Although this increases the rate of curing, it is difficult to polish the resulting surfaces to a high loss or for repair purposes.

Substantially higher reactivities than with unsaturated polyesters can be achieved by curing unsaturated resins based on acrylate with ultraviolet radiation (according to Glasurit Handbuch Lacke und Farben, reactivity difference factor of 4 to 5. according to W. Fischer, I-Lack 61, 2, 1993, 54 to 58, reactivity difference factor of up to 35). However, compared with unsaturated polyesters, unsaturated acrylates have the disadvantage that it is difficult to cure them in a stress-free form in thicker layers and they cannot be sanded satisfactorily and above all have very poor polishability. Attempts have been made to improve the polishability of these coatings by addition of elastic resins. However, on absorbent or uneven substrates, such as wood, it has been observed that the coatings have very poor adhesion.

An object of the present invention is to provide UV-curable binders, which are suitable for the preparation of high-gloss coatings and do not have the disadvantages of the prior art.

This object can be achieved with the binders according to the invention, which are distinguished by a high reactivity during curing. Coatings produced therefrom have good polishability and stability and form high-gloss surfaces.

SUMMARY OF THE INVENTION

The present invention relates to binders, which can be cured by free-radical polymerization initiated by UV light, and contain a) 10 to 90 parts by wt. of a polymer which contains, in chemically bound form, both ethylenically unsaturated groups and the reaction product of a resin containing abietic acid with not more than 50% of the OH groups of a polyfunctional alcohol having a molecular weight of less than 500.

b) 10 to 90 parts by wt. of one or more mono-, di- or oligoesters of (meth)acrylic acid having a molecular weight of less than 800 and c) optionally 0.1 to 10 parts by wt. of a photoinitiator component for the free-radical polymerization wherein the weights of a) and b) add Lip to 100.

The present invention also relates to coating compositions containing these binders which are suitable for the production high-gloss coatings.

DETAILED DESCRIPTION OF THE INVENTION

Suitable alcohols for reacting with the resin containing abietic acid include dihydric, trihydric or higher functional alcohols having a molecular weight of less than 500. Alcohols which are trihydric or more than trihydric are preferably used, more preferably trihydric alcohols. Examples of dihydric alcohols are those having 2 to 15 carbon atoms such as ethylene glycol, propane-1,2-diol, propane-3-diol, diethylene glycol, dipropylene glycol, the isomeric butanediols, neopentylglycol, hexane-1,6-diol, 2-ethylhexanediol and tripropylene glycol. Preferred dihydric alcohols include ethylene glycol, propane-1,2-diol, propane-3-diol, diethylene glycol and dipropylene glycol. Examples of trihydric alcohols are those having 3 to 20 carbon atoms such as glycerol, trimethylolpropane and alkoxylated derivatives thereof. Trimethylolpropane is particularly preferred. Examples of higher functional alcohols are those having 4 to 20 carbon atoms such as pentaerythritol, ditrimethylolpropane and alkoxylated derivatives thereof. Pentaerythritol is preferred.

Suitable resins containing abietic acid include colophony and its acid-containing derivatives, in particular balsam resins, root resins and tall resins: balsam resins are preferably used. The balsam resins are named according to their countries of origin, for example Portugal or USA, and with AA, Y, X, WW, WG, N, M, K, I or H, according to their brightness. Resins of high brightness, such as WG, WW or X. are preferred. Portuguese balsam resin WW is particularly preferred.

The product Tenex (manufacturer: Bergvik Kemi AB, Sandarne, Sweden), is an example of a suitable root resin. Suitable tall resins include products such as Beviros SG (manufacturer: Bergvik Kemi AB, Sandarne, Sweden), Acintol R-S (manufacturer: Bergvik Kemi AB, Sandarne. Sweden), Sacotan 85 (manufacturer: Krems Chemie, Krems, Austria), Oulo 331 (manufacturer: Veitsiluoto Oy, Oulu Finland), Petrosin 90 (manufacturer: Peterson A/S, Greaker, Norway), Unitol NCY (manufacturer: Union Camp Chemicals, Durham, UK) and Valke Tall Resin A (manufacturer: Valks Chemicals, Valkeakoski, Finland).

The reaction of the resin containing abietic acid with the polyfunctional alcohol is a condensation reaction. This reaction is preferably carried out at elevated temperatures of 100 to 250° C., preferably 140 to 220° C. Water of reaction is distilled off until the acid number of the reaction mixture is less than 15 mg, KOH/g, substance, preferably less than 10 mg KOH/g substance. It is also possible to distill off the water of reaction as an azeotrope with a suitable solvent. After the end of the reaction the solvent is preferably distilled off under reduced pressure. Suitable solvents include toluene, xylenes and aliphatic and cycloaliphatic hydrocarbons; toluene is preferred.

In one embodiment of the process, an esterification catalyst is also present. Suitable catalysts are known and include strong inorganic acids, such as sulfuric acid and phosphoric acid, and strong organic acids, such as p-toluenesulfonic acid and chloroformic acid. To prevent undesirable premature polymerization in the reaction and undesirable severe discoloration, it is preferred to add to the reaction mixture 0.01 to 0.3 wt. %, based on the total weight of the reactants, of known polymerization inhibitors or antioxidants. Examples are described, e.g., in "Methoden der organischen Chemie" (Houben-Weyl), 4th edition, volume XIV/1, p. 433 et seq., Georg Thieme Verlag, Stuttgart 1961.

In a preferred embodiment of the process an oxygen-free gas, preferably nitrogen, is passed over the reaction mixture in order to prevent undesirable reactions faith oxygen.

In addition to containing a resin based on the reaction product of abietic acid with a polyfunctional alcohol, polymers a) also contain ethylenically unsaturated groups. These polymers are known for radiation curing and contain OH-functional molecules as starting components. Suitable polymers are described, for example, in P. K. F. Oldring (ed.), Chemistry & Technology of UV & EB Formulations For Coatings. Inks & Paints, vol. 2, 1991, SITA Technology, London, p. 31 to 235. Examples include urethane acrylates, polyester acrylates, polyether acrylates and unsaturated polyesters. Polyester acrylates and unsaturated polyesters are preferred, and unsaturated polyesters based on maleic acid and/or fumaric acid are particularly preferred.

The preparation of these polymers is modified for the process according to the invention by replacing 1 to 90 mole % (based on OH), preferably 5 to 50 mole % and more preferably 10 mole % of the OH components with the reaction product of a resin containing abietic acid with a polyfunctional alcohol.

The mono-, di- or oligoesters of (meth)acrylic acid suitable for use as component b) are compounds known from coatings technology. These compounds are referred to as reactive diluents and are intended to lower the viscosity of the non-cured paint and are polymerized during curing,. Such compounds are described in P. K. T. Oldring (ed.), Chemistry & Technology of UV & EB Formulations For Coatings, Inks & Paints, vol. 2, 1991, SITA Technology, London. p. 237–285.

Examples include esters of acrylic acid or methacrylic acid, preferably of acrylic acid with alcohols. Suitable monohydric alcohols include aliphatic alcohols such as the isomeric butanols, pentanols, hexanols, heptanols, octanols, nonanols and decanols, cycloaliphatic alcohols such as isobornol, cyclohexanol, alkylated cyclohexanols and dicyclopentanol; arylaliphatic alcohols such as phenoxyethanol and nonyl-phenylethanol, and tetrahydrofurfuryl alcohols. Alkoxylated derivatives of these alcohols can also be used.

Suitable dihydric alcohols include ethylene glycol, propane-1,2-diol, propane-1.3-diol, diethylene glycol, dipropylene glycol, the isomeric butanediols, neopentylglycol, hexane-1,6-diol, 2-ethylhexanediol, tripropylene glycol and alkoxylated derivatives of these alcohols. Preferred dihydric alcohols are hexane-1,6-diol, dipropylene glycol and tripropylene glycol.

Suitable trihydric alcohols include glycerol, trimethylolpropane and alkoxylated derivatives thereof. Propoxylated glycerol is preferred. Suitable polyhydric alcohols include pentaerythritol, ditrimethylolpropane and alkoxylated derivatives thereof.

Photoinitiator compounds c) are known and include compounds that can induce a free-radical polymerization after irradiation with high-energy radiation, such as UV light. Suitable photoinitiators are described, for example, in P. K. T. Oldring (ed.). Chemistry & Technology of UV & EB Formulations For Coatings. Inks & Paints, vol. 3, 1991, SITA Technology, London, p. 61–325. They are used in amounts of 0.1 to 10 parts by wt. preferably 2 to 7 parts by wt. and more preferably 3 to 4 parts by wt. based on the weight of components a) and b).

The coating compositions can also contain the known additives from coating technology, such as fillers, pigments, dyestuffs, thixotropic agents, leveling agents, matting agents and flow control agents, in known amounts.

The coating compositions according to the invention can be used as the sole binder or in a mixture with other binders which can be cured by radiation.

The invention is further illustrated but is not intended to be limited by the following examples in which all parts and percentages are by weight unless otherwise specified.

EXAMPLES

Example 1—Precursor Containing Abietic Acid 5 10.26 kg of Portuguese balsam resin WW 4.02 kg of trimethylolpropane and 0.007 kg of toluhydroquinone were weighed into a 15 liter stirred tank equipped with a distillation attachment and nitrogen (30 to 40 l/h) was passed over the mixture for 30 minutes. The stream of nitrogen was reduced to 8 to 10 l/h and the mixture was heated to 120 to 130° C. When the resin had melted, the stirrer Incas switched on. The reaction mixture was subsequently heated to 140° C. over a period of 2 h, and then maintain the following temperatures: 1 h at 140° C., 1 h at 150° C. 1 h at 160° C., 1 h at 170° C., 1 h at 180° C., 1 h at 200° C. and I h at 220° C. The stream of nitrogen was then increased to 20 l/h and the reaction mixture was heated to 230° C. and stirred at this temperature until the acid number was less than 10 mg KOH per g substance.

When the acid number was reached, the mixture was cooled to 100° C. and drained hot into a dish. After the resin had solidified, it was comminuted into a coarse powder.

Example 2—Unsaturated Polyester From Abietic Acid Resin Precursor 3.59 kg of the precursor containing abietic acid were weighed into a 15 liter stirred tank with a distillation attachment and, while passing through nitrogen (30 to 40 l/h). was heat to 120° C. After the resin had melted the stirrer was started and 3.19 kg, of ethylene glycol, 2.76 kg of trimethylolpropane diallyl ether. 5.49 kg, of maleic anhydride and 0.007 kg of toluhydroquinone were added. The temperature was increased to 180° C. over a period of 5 h. The overhead temperature was maintained below 102° C. until the acid number was less than 20 mar KOH per g substance. At this time the reaction mixture was cooled to 105° C. and then 0.021 kg of toluhydroquinone and 0.0004 kg of 2,5-ditert-butylquinone were added followed by the addition of 6.01 kg of dipropylene glycol diacrylate.

The product had an acid number of 14 mg KOH/g substance, an iodine color number of 9 and a viscosity of 12 Pa.s at 23° C.

Example 3—Comparison: Unsaturated polyester with precursor containing,) abietic acid in styrene.

Example 2 was repeated with the exception that 6.01 kg of styrene were used instead of 6.01 kg of dipropylene glycol diacrylate.

Example 4—Comparison: Unsaturated Polyester Without Precursor Containing Abietic Acid 4.66 kg of maleic anhydride, 4.13 kg of diethylene glycol. 1.35 kg of trimethylol-propane diallyl ether, 0.72 kg of 1,2-propanediol and 0.001 kg of toluhydroquinone were weighed into a 15 liter stirred tank equipped with a distillation attachment and, while passing through nitrogen (20 to 30 l/h), was heated to 180° C. After the resin had melted, the stirrer was started. The temperature was maintained at 180° C. for 10 hours, then cooled to 140° C. and stirred at this temperature until the acid number was less than 25 mg KOH per g substance. At this time the reaction mixture was cooled to 105° C. and then 0.021 kg of toluhydroquinone and 0.0004 kg, of 2.5-di-tert-butylquinone were added followed by the addition of 3.33 kg of dipropylene glycol diacrylate.

The product had an acid number of 24 mg KOH/g substance, an iodine color number of 3 and a viscosity of 2 Pas at 23° C.

Example 5—Comparison: Polyester Acrylate 2.18 kg of adipic acid, 1.48 kg of phthalic acid, 3.17 kg of diethylene (glycol, 1.67 kg of trimethylolpropane and 0.003 kg of Fascat® 4100 [BUTYLSTANNOIC ACID (ELF ATOCHEM; VLISSINGEN NETHERLANDS] were added to a reaction vessel. A single tank volume of nitrogen per hour was passed through the reaction mixture, which was heated to 160° C. from approx. 80° C. with stirring. The reaction mixture was then heated from 160° C. to 190° C. over a period of approx. 4 hours, and keep at 190° C. until the acid number was #10 mg KOH/g substance.

A single tank volume of air per hour was passed through the tank and twice the tank volume of nitrogen per hour was passed over the tank. 4.20 kg of isooctane, 2.69 kg of acrylic acid, 0.075 kg of paratoluenesulfoniic acid, 0.30 kg, of para-methoxyphenol and 0.002 kg of 2,5-di-tert-butylhydroquinone were added to the reactor and heated to the reflux temperature while stirring (approx. 90 to 105° C.). The reaction mixture was kept under vigorous reflux until an acid number of #3 mg) KOH/g substance was obtained. The temperature was then reduced to 50° C. and 0.21 kg of glycidyl methacrylate was added. A vacuum was slowly applied at 50° C. and solvent was distilled off until no more solvent was removed at approx. 90° C. under a vacuum of #50 mbar. The temperature and vacuum was maintained for an additional 10 minutes and then the reaction mixture was aerated and cooled to 60° C. The temperature was increased to 90° C., while passing through air and passing over nitrogen, and stirred until the acid number was #1 mg KOH/g substance. The resulting product had a viscosity of 7 Pas at 23° C. and an iodine color number of 1–2.

Example 6—Preparation and Curing of Coating Compositions and Testing of the Coatings The polyester resins prepared in examples 2, 3. 4 and 5% were mixed with dipropylene glycol diacrylate (DPGDA) (ex. 2: 100 parts resin ex. 2:80 parts DPGDA, 4,5) or styrene (ex. 3) to a flow viscosity of 65 s/DIN 4 cup, and 3 wt. % of phenyl 2-hydroxy-2-propyl ketone photoinitiator was added. The resulting coating compositions were applied by means of pouring in application amounts of 300 g/m² to a walnut wood substrate primed with an unsaturated polyester resin (Roskydal 300/1. Bayer AG), which had been UV-cured and sanded.

After waiting at 23° C. for 0.5 min, curing was then carried out with Hg vapor-high-pressure lamps (80 W/cm) such that hard, scratch-resistant and firmly adhering coatings were formed. The maximum possible belt speed is a measure of the reactivity of the coating composition.

The coatings were kept at 23° C. for 16 hours. To test the sandability, the coatings were initially pre-sanded with 320 grit sandpaper (Si carbide, waterproof) and then sanded with 500 grit sandpaper (Si carbide, waterproof). The degradation of the coating and the blocking of the sandpaper were evaluated.

To test polishability, the surfaces were polished on a polishing buck with lambskin discs and with the addition of a fine-grained stick wax (Menzerna, Karlsruhe, Germany until the maximum gloss was achieved.

The results are set forth in the following table:

|  | Belt speed during the UV curing | Sand-ability | Gloss after polishing (20°) | Polishing time |
|---|---|---|---|---|
| Ex. 2 (according to the invention Unsat. polyester with resin from ex. 1 in DPGDA | 4 m/min | very good | 80 | 2 min |
| Ex. 3 (comparison) Unsat. polyester with resin from ex. 1 in styrene | 1 m/min | very good | 70 | 2 min |
| Ex. 4 (comparison) Unsat. polyester in DPGDA | 4 m/min | very good | 15 | 5 min |
| Ex. 5 (comparison) Polyester acrylate | 4 m/min | satisfactory | 60 | 5 min |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A binder, which can be cured by free-radical polymerization initiated by UV light, and comprises a) 10 to 90 parts by wt. of a polymer which contains, in chemically bound form, both ethylenically unsaturated groups and the reaction product of a resin containing abietic acid with not more than 50% of the OH groups of a polyfunctional alcohol having a molecular weight of less than 500, b) 10 to 90 parts by wt. of one or more mono-, di- or oligoesters of (meth)acrylic acid having a molecular weight of less than 800 and c) optionally 0.1 to 10 parts by wt. of a photoinitiator component for the free-radical polymerization wherein the weights of a) and b) add up to 100.

2. The binder of claim 1 wherein the polymer comprises an unsaturated polyester.

3. The binder of claim 1 wherein the resin containing abietic acid comprises colophony.

4. The binder of claim 2 wherein the resin containing abietic acid comprises colophony.

5. A coating composition containing the binder of claim 1 which is suitable for the production high-gloss coatings.

6. The binder of claim 1 wherein said reaction product has an acid number of less than 15 mg KOH/g substance.

7. The binder of claim 2 wherein said reaction product has an acid number of less than 15 mg KOH/g substance.

8. The binder of claim 3 wherein said reaction product has an acid number of less than 15 mg KOH/g substance.

9. The binder of claim 4 wherein said reaction product has an acid number of less than 15 mg KOH/g substance.

* * * * *